United States Patent [19]
Horsley et al.

[11] Patent Number: 5,549,817
[45] Date of Patent: *Aug. 27, 1996

[54] STORMWATER TREATMENT SYSTEM/APPARATUS

[75] Inventors: Scott W. Horsley, Boston; Winfried Platz, Barnstable, both of Mass.

[73] Assignee: Stormtreat Systems, Inc., Hyannis, Mass.

[*] Notice: The term of this patent shall not extend beyond the expiration date of Pat. No. 5,437,786.

[21] Appl. No.: 387,476

[22] Filed: Feb. 13, 1995

Related U.S. Application Data

[63] Continuation-in-part of Ser. No. 195,447, Feb. 14, 1994, Pat. No. 5,437,786.

[51] Int. Cl.$^6$ .................................................. C02F 3/22
[52] U.S. Cl. ...................... 210/122; 210/170; 210/256; 210/301; 210/540; 210/602
[58] Field of Search .................................. 210/170, 253, 210/256, 259, 300, 301, 532.2, 602, 747, 150, 151, 122, 255, 521, 522, 533, 535, 540

[56] References Cited

U.S. PATENT DOCUMENTS

| | | | |
|---|---|---|---|
| 732,208 | 6/1903 | Mitchell | 210/253 |
| 1,573,929 | 2/1926 | Gall | 210/301 |
| 1,902,171 | 3/1993 | Kopp | 210/301 |

(List continued on next page.)

FOREIGN PATENT DOCUMENTS 58-70890  4/1983  Japan.

OTHER PUBLICATIONS

Constructed Wetlands for Wastewater Treatment, (Lewis Publishers, 1989), Hammer. (book) (not submitted with this communication).

The Use of Wetlands for Controlling Stormwater Pollution, (The Terrine Institute, 1992), Strecker et al. (book) (not submitted with this communication).
Results of the Nationwide Urban Runoff Program, vol. 1—Final Report, (U.S. Environmental Protection Agency, 1983) (book) (not submitted with this communication).

Primary Examiner—Christopher Upton
Attorney, Agent, or Firm—Lahive & Cockfield

[57] ABSTRACT

A method and apparatus for treating contaminated stormwater runoff from roads and adjacent lands. A multi-stage and self-contained integrated module is designed to collect the first flush of stormwater runoff (which contains the majority of pollutants) and to treat the pollutants using sedimentation, filtration and constructed wetlands. The apparatus is mass-produced to provide standardized hydrologic controls, important to the reliability of the constructed wetland component of the apparatus.

Raw stormwater enters the central sedimentation chamber of the apparatus which is divided into multiple segments designed to provide a series of sedimentation/filtration chambers. At least one chamber is provided with a removable filter bulkhead. Effluent from the final sedimentation chamber is discharged to the constructed wetland system which surrounds the central sedimentation tank. Water flows through the perimeter wetland system in subsurface/saturated conditions and contacts the root zone of the constructed wetland where biochemical interactions attenuate pollutants.

A skimmer tube may be positioned in at least one chamber to pass water from near the surface through an adjacent bulkhead to the lower part of the next chamber.

A hydrologic control valve in the apparatus regulates the flow of water from the central sedimentation tank to the wetland and the effluent discharge rate out of the wetland. This control and the standardization of the construction allows for precise hydrologic controls designed to provide a 5–10 day holding time within the apparatus.

11 Claims, 4 Drawing Sheets

U.S. PATENT DOCUMENTS

| | | | |
|---|---|---|---|
| 3,770,623 | 11/1973 | Seidel | 210/170 |
| 3,817,864 | 6/1974 | Carlson | 210/170 |
| 4,132,645 | 1/1979 | Bottomley et al. | 210/104 |
| 4,162,976 | 7/1979 | Monson | 210/170 |
| 4,293,421 | 10/1981 | Green | 210/603 |
| 4,824,572 | 4/1989 | Scott | 210/602 |
| 4,839,051 | 6/1989 | Higa | 210/602 |
| 4,995,969 | 2/1991 | LaVigne | 210/150 |
| 4,997,568 | 3/1991 | Vandervelde | 210/603 |
| 5,073,257 | 12/1991 | Higa | 210/170 |
| 5,137,565 | 8/1992 | Wolverton | 210/195 |
| 5,174,897 | 12/1992 | Wengrzynek | 210/602 |

STORMWATER TREATMENT SYSTEM/APPARATUS

This application is a continuation in part of U.S. patent application Ser. No. 08/195,447, filed Feb. 14, 1994, now U.S. Pat. No. 5,437,786.

BACKGROUND OF THE INVENTION

Stormwater runoff is water generated by rain contacting impervious and semipervious land surfaces which contains significant amounts of contaminants. These contaminants are routinely transported to and discharged into downgradient wetlands, streams, lakes and coastal waters (EPA 1983).

Stormwater pollutants include bacteria, viruses, metals, nutrients, oils and other organic compounds. Throughout the Untied States, stormwater pollution has resulted in the closure of shellfish beds, the eutrophication of waters, the pollution of drinking water supplies and impacts to ecological habitats.

Numerous studies performed by US EPA have demonstrated that the first flush of runoff contains the majority of the pollutants. This is because many of the contaminants are associated with sediment particles which accumulate on road and packing lot surfaces between storms and are transported during the beginning of the first significant precipitation event. Contaminants such as oils and other hydrocarbons also collect on impervious surfaces and are typically flushed during the beginning of a storm event.

DISCUSSION OF THE PRIOR ART

The use of sedimentation basins and constructed wetlands to minimize stormwater pollution is known to be an effective process. The Use of Wetlands for Controlling Stormwater Pollution by Strecker et al., (The Terrine Institute, 1992) provides a summary of 20 stormwater projects throughout the United States. The use of constructed wetlands in water pollution control has been known (Higa 1989, Wengrzynek 1992 and Wolverton 1992). Constructed Wetlands for Wastewater Treatment by Donald Hammer (Lewis Publishers 1989) provides an overview of the use of constructed wetlands for control of pollution.

There are several disadvantages to the prior art. These are listed below and are improved upon with the invention.

1. The most common problem with regard to maintaining constructed wetlands has been in controlling water levels. Large basins designed to function as constructed wetlands are subject to wide ranges of flooding and drying. As these basins are open to the atmosphere, extensive evaporation frequently leads to desiccation and death of the wetland plants. Many constructed wetlands have failed for this reason. The invention improves upon this with an enclosed and unified sedimentation basin and constructed wetland providing reliable hydrologic controls.

2. Prior art systems are designed on a case-by-case basis resulting in high engineering costs and highly-variable results. These systems are constructed on site and their success is dependent upon individual hydrologic analyses for that particular site. The invention improves upon this by standardizing the design, the only variable being the number of units which is easily determined by the size of the drainage area and the design storm selected.

3. Although the scientific literature clearly indicates that the greatest pollution attenuation capabilities exist within the subsurface (the root zone), the vast majority of prior art constructed wetland systems rely upon treatment within the above surface zone of the wetland. The invention improves upon this by maintaining the discharge from the sedimentation basin to the wetland subsurface.

4. The prior art for constructed wetlands results in standing surface water. In fact many of the designs encourage a permanent pool associated with a wetland. Such standing water commonly results as a mosquito habitat. As many stormwater treatment systems are in residential areas this can present both a nuisance and potentially a public health hazard. As the pollutant concentrations can be expected to be high in this standing water, mosquitoes and other wildlife are subjected to elevated levels of bacteria, viruses, metals and hydrocarbons. This can result in both acute and chronic impacts to wildlife and the case of mosquitoes may present a potential public health vector problem.

5. Much of the prior art utilizes concrete structures for leaching basins and sedimentation tanks. Such structures are heavy, awkward to handle in sensitive sites near wetlands and other water resources. The invention is to be manufactured of plastic and is significantly less weight, thereby eliminating the need for heavy equipment (such as cranes) for installation purposes.

6. None of the prior art integrates the principals of sedimentation, filtration and constructed wetlands into a unitary configuration optimizing dimensions, flow charts and retention times. The invention accomplishes this as a result of extensive independent variable analysis and hydrologic modeling.

SUMMARY OF THE INVENTION

The invention discloses the use of a pre-fabricated unitary structure to provide the treatment of stormwater by employing sedimentation, oil and grease separation, filtration and constructed wetlands. The invention incorporates all three of these presently-known pollution control technologies into one self-contained apparatus. By integrating these technologies into a single unit, this apparatus optimizes flow rates through the system to maximize sedimentation rates, filtration efficiency and biochemical attenuation within the root zone of the constructed wetland, resulting in a more reliable and efficient treatment mechanism than prior systems.

The invention is designed to be modular and installed in parallel to minimize the inflow rates and subsequently the turbulence within each tank (thereby maximizing sedimentation rates). The number of tanks is determined based upon the drainage area and the desired design flow to be caught and treated. In this way retention times are maximized within each unit, providing increased pollutant attenuation opportunities. Each central sedimentation tank is divided up into a series of chambers, separated by bulkheads. The bulkheads may contain filter elements, oil and grease traps, or be water impermeable. Cleaning of the water passing from one chamber to the next may also be accomplished by taking water from near the surface in one chamber, where settling tends to clear the water and transmitting it through the lower part of the bulkhead to the bottom into the next chamber. The modular design also provides flexibility in locating the units in areas with difficult site constraints (common to many road drainage discharge sites). The flow rates within the apparatus are controlled by the outlet valve.

A hydraulic gradient is established throughout the system. The hydraulic gradient is controlled in part by the hydraulic properties of the sand and gravel substrate within the wetland system. The outlet valve can be adjusted to accommodate various climatic environments. For example, in the southwestern United States where little or no precipitation occurs throughout the summer months, the outlet valve of the apparatus can be closed after the last major rain event, holding the water as an irrigation source for the constructed wetland throughout the dry season. The apparatus has been sized to accommodate applications in this environment by balancing the evapotranspiration rates with the holding volume of the system. The control valve can also be closed in the event of a hazardous waste spill, converting the system into a spill containment device.

One reason that the invention is unique when compared to prior sedimentation and constructed wetland systems is that it operates subsurface and self-contained. This enables longer storage of stormwater in droughty climates (as discussed above), it eliminates direct exposure of polluted surface water to humans and animals, and it eliminates the breeding of mosquitoes (common to many open detention ponds).

DETAILED DESCRIPTION OF THE INVENTION

Referring to the drawings, FIG. 1 is a diagrammatic depiction of the apparatus shown in cross section.

Figure 1:
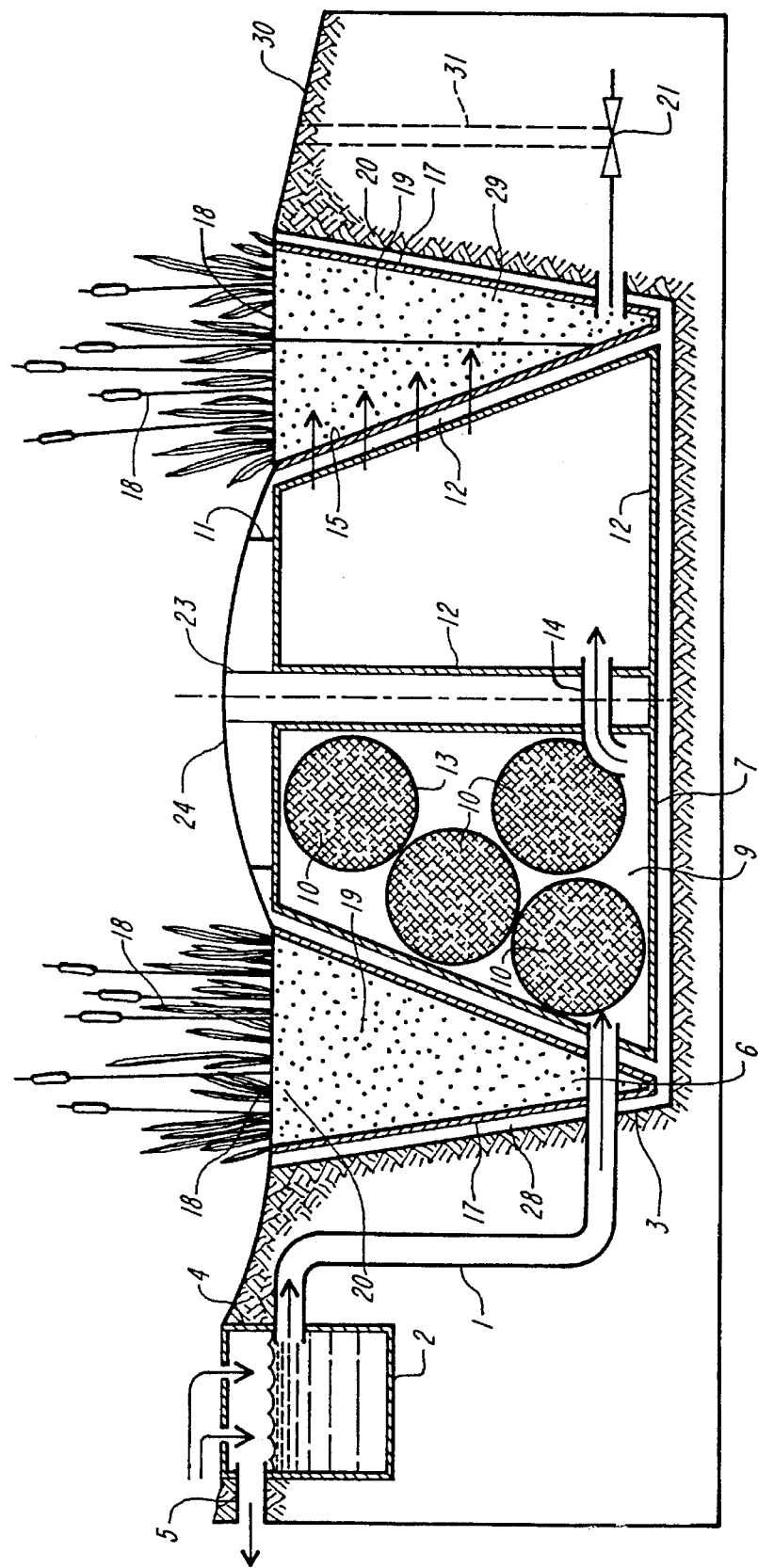
Figure 2:
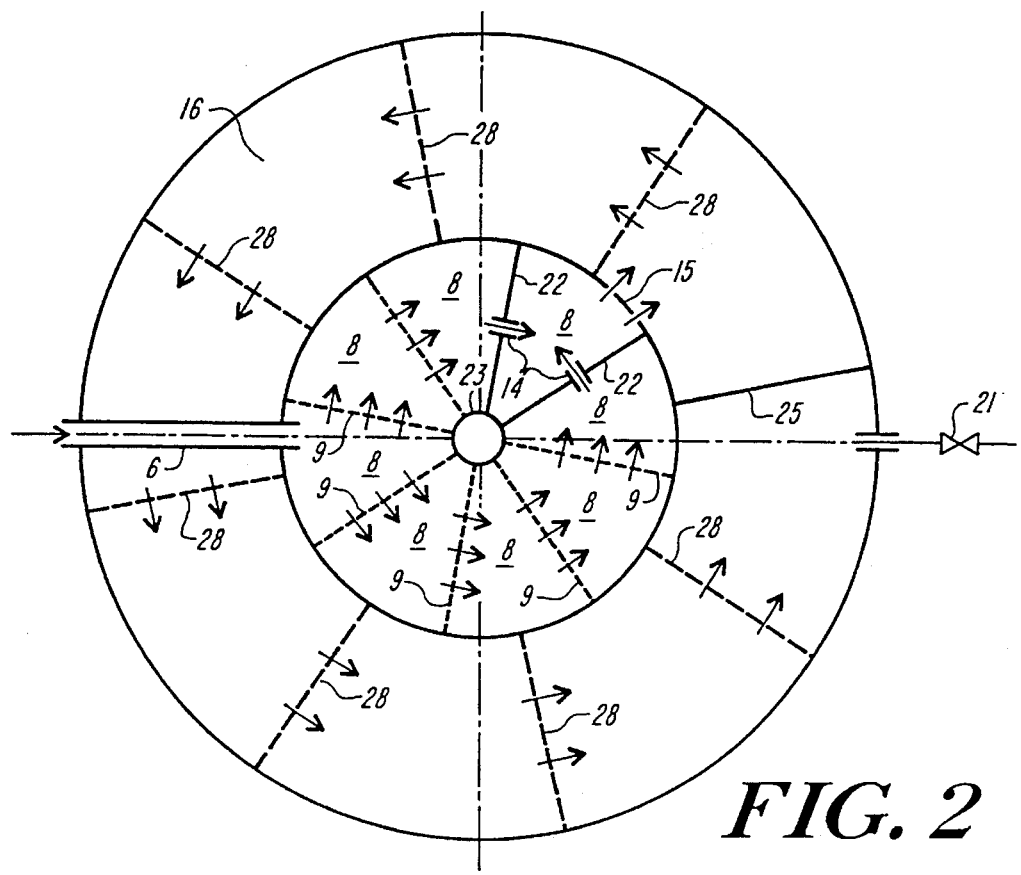
FIG. 2 shows a top view of the apparatus showing the internal chambers and the flow path of water through the system.
Figure 3:
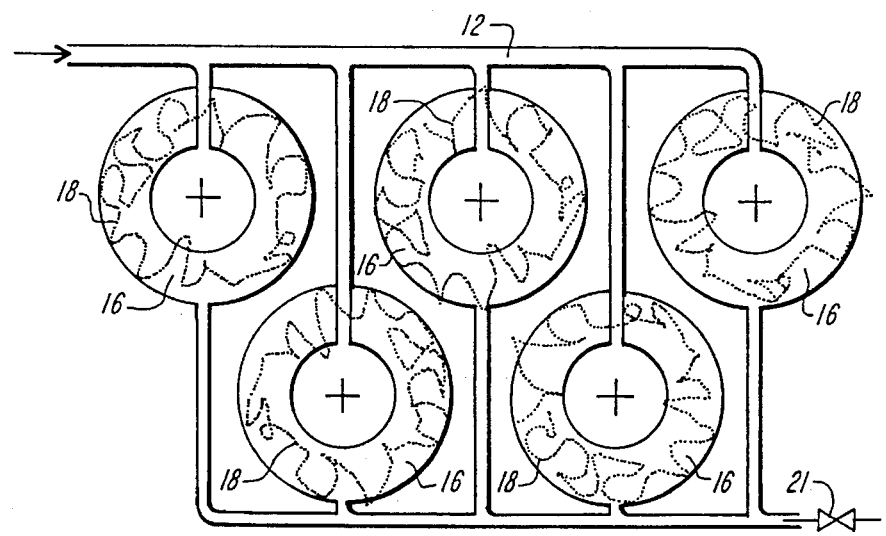
FIG. 3 shows a top view of an example configuration of the apparatus with the individual tanks connected in parallel circuit.

Referring to FIGS. 1, 2 and 3: A manifold feeder pipe 1 conveys stormwater from a catch basin 2 (or other device) and distributes it equally to each treatment tank 3 (only one tank is shown in FIG. 1). The manifold feeder pipe 1 is constructed of PVC and (when used in conjunction with a catch basin 2) is installed into the side wall 4 of the catch basin. An overflow pip 5 is also installed into the catch basin approximately 6 inches higher than the manifold feeder pipe 1 to provide for the discharge of stormwater in excess of the first flush (one half to one-inch of runoff).

The manifold feeder pipe 1 discharges the stormwater through the inlet port 6 to each of the sedimentation tanks 3 which are placed in ground 30 with the tops flush with the lands surface. The inlet port 6 is located on the inner wall of the central sedimentation basin 7. Water flows through eight chambers 8, between which a series of filtration bulkheads 9 are placed.

The filtration bulkheads 9 support a series of sequentially-finer mesh filters 10 to preferentially trap different grain size sediments in each chamber 8. The filter bulkheads 9 can be easily removed through a centrally-located manhole 11 and cover 24 located on the top of the system. Each filter bulkhead 9 slides into and out of the central sedimentation basin 7 through a set of filter bulkhead tracks 12 molded onto the bottom and the sides of the central sedimentation basin 7. They are also secured to a center support pillar 23 which is easily removable to access and remove the filtration bulkheads. Each filter 10 is affixed to the bulkhead 9 using an easily-removable filter clip 13.

The final sedimentation chamber 8 is preceded by oil and grease traps 14. it contains an infiltration wall 15 to the perimeter wetland system 16. Water is directed counter-clockwise towards the outlet control valve 21 by solid bulkhead 25. The wetland system 16 is contained within a water-tight V-shaped basin 17, which surrounds the central sedimentation basin 7. The V-shaped basin 17 is segmented by perforated bulkheads 28. It is filled with sand and gravel and is planted with a combination of wetland plants 18 (such as cattails, burreed and bullrush). The 3–4 foot depth of the sand and gravel 19 supports the root zone 20 of the wetland plants 18 and provides a constant source of soil moisture to support the plant community and also the root treatment zone 20 through which the stormwater must flow. Biochemical activities associated with microbes which grow within the root zone 20 provide treatment (including denitrification) of the water passing through the constructed wetland 16. The sand and gravel matrix 19 which services as a substrate for the wetland plants 18 also provides a filtering medium for pollutants such as coliform bacteria and as a precipitation site for other pollutants such as phosphorus.

The effluent outlet control valve 21 controlled remotely through an access well 31 regulates the rate of discharge from the perimeter wetland 16 and in this manner controls the holding (retention) time within the entire system. For most applications the holding time will be set at 5–10 days to provide adequate sedimentation, oil/grease separation times and contact time within the wetland system 16. This holding time also enables the system to be available to catch the next storm which might generate significant loading of pollutants (storm events in the interim are not believed to generate significant pollutant loading due to inadequate time for the pollutants to be deposited within the drainage area).

Figure 4:
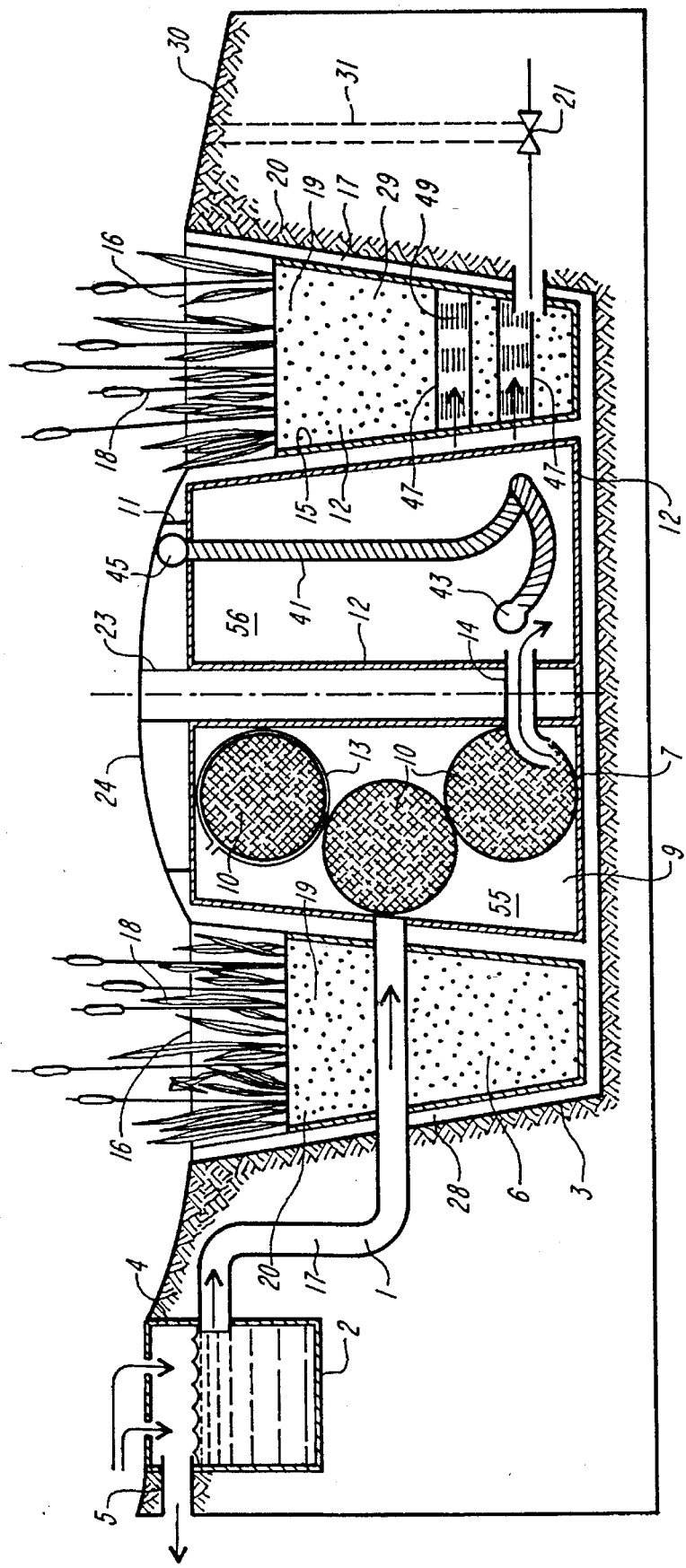
FIG. 4 is an illustration in cross-sectional view of a storm water treatment apparatus constructed in accordance with the principles of this invention including a skimmer device.
Figure 5:
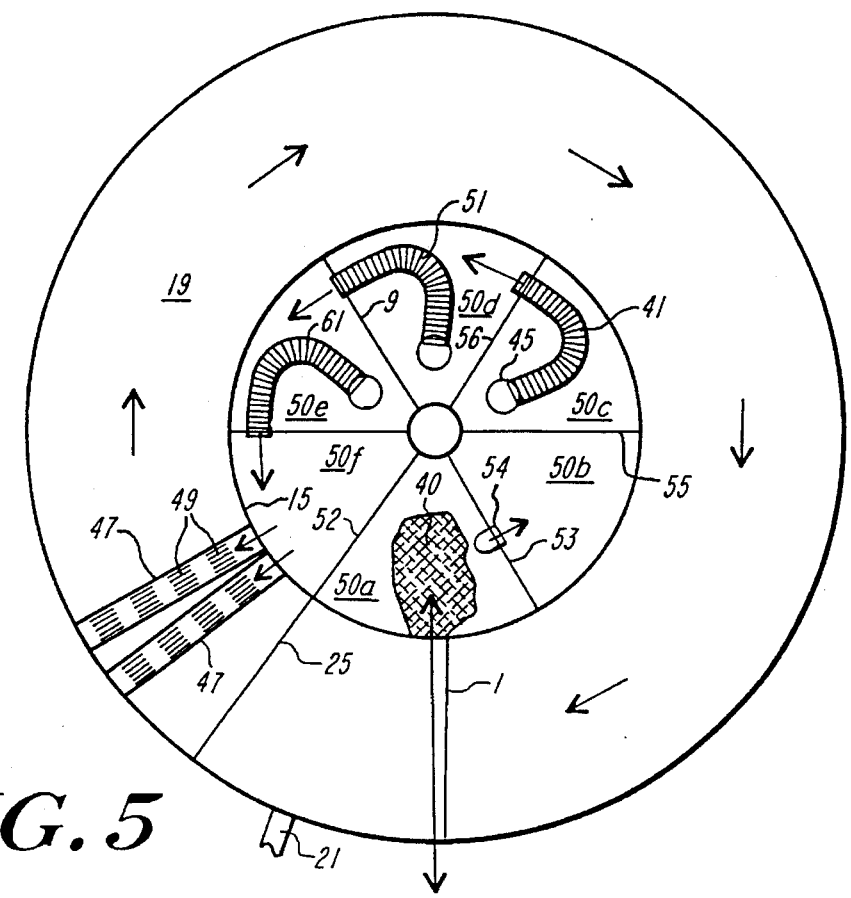
FIG. 5 is a top view of the sedimentation module of FIG. 4.

FIGS. 4 and 5 show a water treatment system including a sedimentation module in which like parts of FIGS. 1, 2 and 3 are like numbered.

In this apparatus, however, bulkhead 59, which partitions central sedimentation tank 7 into discrete chambers 50a–50f are constructed somewhat differently than those in the embodiments of FIGS. 1 and 2. Additionally, the wetlands section 19 is not partitioned off with a series of radial bulkheads extending from the sedimentation tank to the periphery. Rather a singe water impermeable bulkhead 25 is positioned to ensure a unidirectional water flow through the wetlands. The infiltration wall section 15 is also formed differently. In this configuration the wall section 15 is not perforated, but rather has four pipes 47 leading out close to the bottom of the sedimentation tank into the wetland. Each of these pipes are well pipes formed of PVC and slotted as indicated at 49, thereby allowing water as it passes into those pipes to seep out of the slots into the wetland. The most significant feature of this embodiment, which differs from that of the earlier embodiments, is the inclusion of a skimmer device provided in several individual chambers in the central sedimentation tank 7. The skimmer device provides for water being transferred from one chamber to the next, by taking water from the upper surface and passing it through an otherwise solid bulkhead close to the bottom of the sedimentation tank. In the arrangement illustrated in FIGS. 4 and 5, the storm water enters into the sedimentation module through input port 1 where it enters through a coarse, replaceable biodegradable filter 40, such as a burlap bag. The chamber 50a in the sedimentation tank is formed with one bulkhead 52, which lies between chambers 50a and 50f, which bulkhead is formed as a water impermeable member preventing water which flows counterclockwise around the series of chambers 50a through 50f continuing in that path and thereby forces it into the outlet pipe 47. The other bulkhead 53 which forms the chamber 50a is also water impermeable except for a conventional grease trap 54 mounted in the wall at the bottom of the central sedimentation tank to trap grease and oil which may be contained in the storm water, while allowing the water itself to pass through the bulkhead 53. Bulkhead 55 is formed as illustrated with a series of filters 10 fixed in the plane of the bulkhead so that water passing from chamber 50b to chamber 50c is passed through these filters.

Figure 6:
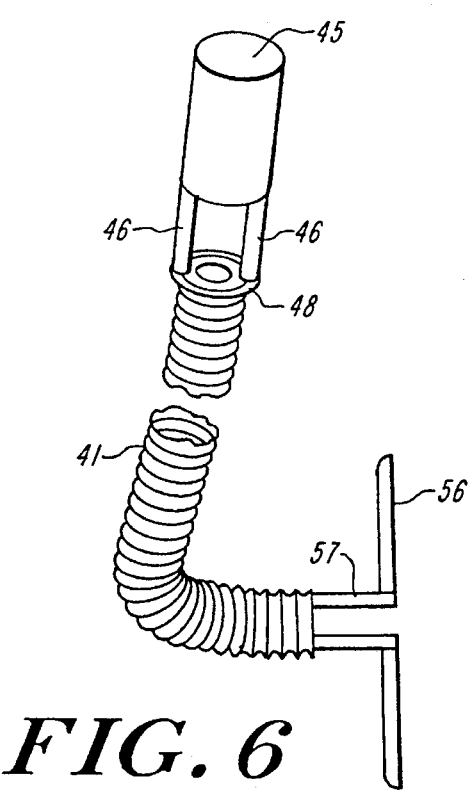
FIG. 6 is a perspective view of a skimmer device shown in FIGS. 4 and 5.

Chamber 50c carries a skimmer device, which is illustrated in detail in FIG. 6. It consists of a float 45 which may be suitably formed of molded polyethylene, and has extending from its lower surface a pair of struts 46 terminating in a ring 48 close in diameter to that of the flexible robe 41. The flexible tube 41 can be attached to the ring by screwing the spiral outer wall of the tube into the ring. The tube may conveniently be constructed of vacuum-formed, single-ply PVC. The bulkhead 56 is solid except for an opening near the bottom thereof. The bulkhead 56 is molded with a collar 57 integral with it and extending from and surrounding an opening in the bulkhead. The collar 57 is of a size such that the lower end of the flexible tube 41 fits snugly over it, thereby providing that water which enters the tube at the upper surface of water in chamber 50c is transferred to the next chamber 50d at the bottom. Skimmers 51 and 61 are similarly constructed. The overall arrangement is, then, one where storm water enters the treatment system through inlet port 1 and rough material is filtered out through the burlap 40. Grease and oil are then removed as the water flows through the trap in bulkhead 53. The water is filtered passing from compartment 50b to 50c through the series of filters 10. Thereafter, the water is taken from each compartment from the upper few inches of water in each chamber and passed at the bottom of the compartment to the next compartment. Since the natural settling tends to clear the water just below the upper surface before the lower portions of the water are cleared, the clearer portion of water is being passed from each one of the compartments through a skimmer until it arrives at the outlet tubes 47.

It will be understood that the details of construction are exemplary only, and that other structures may be employed to perform these functions.

It can thus be seen that the invention as disclosed is a particularly advantageous construction for a self-contained and multi-stage stormwater treatment system.

We claim:

1. A stormwater treatment apparatus comprising, a lightweight watertight integrated sedimentation tank module, said sedimentation tank module having a central sedimentation tank with an open top within it, formed integrally with an annular perimeter basin, also within said sedimentation tank module, said central sedimentation tank having a removable watertight cover at said open top, said annular perimeter basin having an open top and a wetland formed of sand and gravel deposited within it, said open top including wetland plants, having roots extending downwardly into said sand and gravel, said central sedimentation tank including an inlet port from outside said basin for carrying stormwater into said covered central sedimentation tank and having an infiltration section in the wall between it and the annular perimeter basin, said infiltration section being transmissive of water, but generally not transmissive of particulate materials, and located to pass water into said perimeter basin in the subsurface area of said wetland plants roots, said central sedimentation tank being formed with a plurality of bulkheads each extending radially from the center of said central sedimentation tank to the perimeter thereof, said bulkheads dividing said central sedimentation tank into a series of adjacent chambers, a first one of said bulkheads adjacent to said infiltration section being formed to be water impermeable, a second one of said bulkheads adjacent to said inlet port being water impermeable except for an oil and grease trap which passes water into the next chambers while blocking oil and grease from passing, said first and second ones of said bulkheads forming a first chamber coupled to said inlet port, at least one additional water impermeable bulkhead forming at least one additional chamber, a flexible tube positioned in at least one of said additional chambers, said flexible tube having a float attached to one end for floating on the surface of any water within said chamber with an inlet opening provided in said flexible tube adjacent to said float, below said water surface, the other end of said flexible tube penetrating an adjacent wall common to said chambers and the next adjacent chambers near the bottom of said sedimentation tank, said flexible tube other end having an outlet, whereby water from the surface of water where said float is located passes to the next compartment near the bottom thereof, an outlet port located near the bottom of said annular perimeter basin, said outlet port including valve means which can be preset to control the throughput of water entering said sedimentation tank and exiting said annular perimeter basin at said outlet port.

2. A stormwater treatment apparatus in accordance with claim 1 wherein a third one of said bulkheads is formed with filter panels therein in the plane of said bulkhead to permit flow of water through said bulkhead while screening particulate material.

3. A stormwater treatment apparatus in accordance with claim 2 wherein said bulkheads divide said central sedimentation tank into at least six adjacent chambers, and wherein at least three of said chambers include one of said flexible tubes.

4. A stormwater treatment apparatus in accordance with claim 1 wherein said annular perimeter basin includes a water impermeable bulkhead extending from the outer perimeter of said annular perimeter basin inwardly to the perimeter of said central sedimentation tank, said water impermeable bulkhead being positioned between said infiltration section and said inlet port.

5. A stormwater treatment apparatus in accordance with claim 1 wherein said infiltration section is formed of one or more perforated wall tubes positioned near the bottom of said central sedimentation tank and connected through said sedimentation tank wall between said wetlands and said central sedimentation tank, with said perforated walls lying within said wetland.

6. A stormwater treatment apparatus in accordance with claim 5 wherein said perforations are slots.

7. A stormwater treatment apparatus in accordance with claim 1 wherein said inlet port has affixed to it a rough biodegradable filter for screening solid objects from entering said central sedimentation tank.

8. A stormwater treatment apparatus in accordance with claim 1, wherein said float includes a ring spaced below said float and attached thereto by struts, and wherein said flexible tube threads into said ring.

9. A stormwater treatment apparatus comprising, a lightweight watertight integrated sedimentation tank module, said sedimentation tank module having a central sedimentation tank with an open top within it, formed integrally with an annular perimeter basin, also within said sedimentation tank module, said central sedimentation tank having a removable watertight cover at said open top, said annular perimeter basin having an open top and a wetland formed of sand and gravel deposited within it, said open top including wetland plants, having roots extending downwardly into said sand and gravel, said central sedimentation tank including an inlet port from outside said basin for carrying stormwater into said covered central sedimentation tank and having an infiltration section in the wall between it and the annular perimeter basin, said infiltration section being transmissive of water, but generally not transmissive of particulate materials, and located to pass water into said perimeter basin in the subsurface area of said wetland plants roots, said central sedimentation tank being formed with a plurality of bulkheads each extending radially from the center of said central sedimentation tank to the perimeter thereof, said bulkheads dividing said central sedimentation tank into a series of adjacent chambers, a first one of said bulkheads adjacent to said infiltration section being formed to be water impermeable, a second one of said bulkheads adjacent to said inlet port being water impermeable except for an oil and grease trap which passes water into the next chambers while blocking oil and grease from passing, said first and second ones of said bulkhead forming a first chamber coupled to said inlet port, at least one additional water impermeable bulkheads forming at least one additional chamber, means positioned in at least one of said additional chambers for transferring water from the surface of the water in said additional chamber to the next chamber near the bottom thereof, an outlet port located near the bottom of said annular perimeter basin, said outlet port including valve means which can be adjusted to control the throughput of water entering said sedimentation tank and exiting said annular perimeter basin at said outlet port.

10. A stormwater treatment apparatus in accordance with claim 9 wherein a third one of said bulkheads is formed with filter panels therein in the plane of said bulkhead to permit flow of water through said bulkheads while screening particulate material.

11. A stormwater treatment apparatus in accordance with either of claims 1 or 9 including a plurality of said flexible tubes each associated with one of said chambers, wherein each of the adjacent walls penetrated by a flexible tube provide no other passageway for water from one of said chambers to the next.

* * * * *